US008576270B1

(12) United States Patent
Vitale et al.

(10) Patent No.: US 8,576,270 B1
(45) Date of Patent: Nov. 5, 2013

(54) INTELLIGENT CALL MANAGEMENT AND REDIRECTION

(75) Inventors: John M. Vitale, Monroe Township, NJ (US); Stuart Morris, South Plainfield, NJ (US)

(73) Assignee: Glowpoint, Inc., Murray Hill, NJ (US)

( * ) Notice: Subject to any disclaimer, the term of this patent is extended or adjusted under 35 U.S.C. 154(b) by 1556 days.

(21) Appl. No.: 11/246,956

(22) Filed: Oct. 11, 2005

Related U.S. Application Data

(60) Provisional application No. 60/616,638, filed on Oct. 8, 2004.

(51) Int. Cl.
*H04N 7/14* (2006.01)
*H04M 1/64* (2006.01)
*H04M 11/00* (2006.01)
*H04M 3/42* (2006.01)

(52) U.S. Cl.
USPC ............ 348/14.06; 348/14.01; 379/88.12; 379/88.13; 379/201.01; 379/207.08

(58) Field of Classification Search
USPC ............ 379/221.14, 88.12, 88.13, 93.24, 379/100.06, 100.08, 201.01, 207.08; 348/14.01, 14.02, 14.03, 14.04, 14.05, 348/14.06, 14.07, 14.08, 14.09, 14.1, 14.11, 348/14.12, 14.13, 14.14, 15.15, 14.16
See application file for complete search history.

(56) References Cited

U.S. PATENT DOCUMENTS

| | | | |
|---|---|---|---|
| 4,805,207 A | | 2/1989 | McNutt et al. |
| 5,557,320 A | * | 9/1996 | Krebs ........................ 725/114 |
| 5,606,361 A | * | 2/1997 | Davidsohn et al. ........ 348/14.01 |
| 5,608,653 A | | 3/1997 | Palmer et al. |
| 5,689,553 A | * | 11/1997 | Ahuja et al. ............. 379/202.01 |
| 5,724,092 A | * | 3/1998 | Davidsohn et al. ........ 348/14.01 |
| 5,737,701 A | | 4/1998 | Rosenthal et al. |
| 5,751,338 A | | 5/1998 | Ludwig, Jr. |
| 5,760,823 A | * | 6/1998 | Brunson et al. ............ 348/14.06 |
| 5,999,525 A | | 12/1999 | Krishnaswamy et al. |
| 6,545,697 B1 | | 4/2003 | Parker et al. |
| 6,559,863 B1 | | 5/2003 | Megiddo |

(Continued)

FOREIGN PATENT DOCUMENTS

EP  1056256 B1  9/2004

OTHER PUBLICATIONS

Intel Corporation and Radvision. (2004). *Video Telephony Services on Intel Processor-based Modular Communications Platforms: Broadening the Services Portfolio, Expanding the Customer Base, and Improving Margins.* Solutions White Paper, pp. 1-8.
International Search Report and Written Opinion, mailed Mar. 10, 2008, directed to related International Application No. PCT/US06/20990. 9 pages.

(Continued)

*Primary Examiner* — Khai N Nguyen
(74) *Attorney, Agent, or Firm* — Vedder Price P.C.

(57) ABSTRACT

The disclosed systems and methods provide intelligent device inspection and interrogation in an application layer system to route packet-based network calls. These systems and methods can be used to detect the status of a specified endpoint. Endpoint devices can be configured to communicate status information to a central call manager. Endpoints can also be periodically polled to request device information. Pre-defined rules applied at the central call manager can be used to process call flow based on the device information. These rules can be configured so that a call that is not completed for any reason can be transferred to another destination such as a video mail service or an automated or live operator service.

23 Claims, 9 Drawing Sheets

(56) References Cited

U.S. PATENT DOCUMENTS

| | | | |
|---|---|---|---|
| 6,683,937 B1 | 1/2004 | Watson et al. | |
| 6,725,303 B1 | 4/2004 | Hoguta et al. | |
| 6,744,858 B1 | 6/2004 | Ryan et al. | |
| 6,750,896 B2 | 6/2004 | McClure | |
| 6,829,233 B1 | 12/2004 | Gilboy | |
| 6,839,340 B1 | 1/2005 | Voit et al. | |
| 6,925,165 B2 | 8/2005 | Cohen et al. | |
| 6,954,521 B2 | 10/2005 | Bull et al. | |
| 7,006,613 B2* | 2/2006 | Novak et al. | 379/142.01 |
| 7,069,291 B2* | 6/2006 | Graves et al. | 709/201 |
| 7,099,288 B1* | 8/2006 | Parker et al. | 370/259 |
| 7,155,001 B2 | 12/2006 | Tiliks et al. | |
| 7,200,213 B2 | 4/2007 | Morris | |
| 7,225,233 B1* | 5/2007 | Fenton | 709/207 |
| 7,243,123 B1 | 7/2007 | Allen et al. | |
| 7,404,001 B2 | 7/2008 | Campbell et al. | |
| 2001/0032112 A1* | 10/2001 | Linz | 705/8 |
| 2001/0043608 A1 | 11/2001 | Potter | |
| 2002/0029350 A1 | 3/2002 | Cooper et al. | |
| 2002/0085702 A1 | 7/2002 | Cox et al. | |
| 2002/0118808 A1 | 8/2002 | Kelleher et al. | |
| 2003/0023854 A1* | 1/2003 | Novak et al. | 713/182 |
| 2003/0041333 A1 | 2/2003 | Allen | |
| 2003/0043974 A1 | 3/2003 | Emerson | |
| 2003/0105820 A1 | 6/2003 | Haims et al. | |
| 2003/0172116 A1* | 9/2003 | Curry et al. | 709/206 |
| 2003/0202112 A1 | 10/2003 | Bowman | |
| 2004/0042414 A1 | 3/2004 | Bouret et al. | |
| 2004/0119814 A1 | 6/2004 | Clisham et al. | |
| 2004/0139471 A1 | 7/2004 | Geen | |
| 2004/0218035 A1 | 11/2004 | Crook | |
| 2004/0239754 A1 | 12/2004 | Shachar et al. | |
| 2004/0240642 A1 | 12/2004 | Crandell et al. | |
| 2005/0012812 A1 | 1/2005 | Seo | |
| 2005/0021809 A1 | 1/2005 | Zhu | |
| 2005/0073574 A1* | 4/2005 | Krisbergh et al. | 348/14.01 |
| 2005/0084077 A1 | 4/2005 | Brown et al. | |
| 2005/0146599 A1 | 7/2005 | Whited et al. | |
| 2006/0026001 A1 | 2/2006 | Bravin et al. | |
| 2006/0075033 A1* | 4/2006 | Bienstock et al. | 709/206 |
| 2006/0171378 A1 | 8/2006 | Harris et al. | |
| 2006/0253895 A1* | 11/2006 | Brandofino et al. | 726/2 |
| 2007/0002777 A1 | 1/2007 | Morris et al. | |
| 2007/0100940 A1 | 5/2007 | Eriksson | |

OTHER PUBLICATIONS

Eriksson, U.S Office Action mailed on Sep. 8, 2008 directed at related U.S. Appl. No. 11/509,820; 8 pages.

Eriksson, U.S Office Action mailed on Apr. 29, 2009 directed at related U.S. Appl. No. 11/509,820; 11 pages.

Brandofino et al., U.S Office Action mailed on Dec. 27, 2007 directed at related U.S. Appl. No. 11/391,673; 9 pages.

Brandofino et al.,U.S Office Action mailed on Sep. 24, 2008 directed at related U.S. Appl. No. 11/391,673;13 pages.

Brandofino et al., U.S Office Action mailed on Apr. 20, 2009 directed at related U.S. Appl. No. 11/391,673;23 pages.

Morris,U.S Office Actions mailed on Sep. 22, 2005 directed at related U.S. Appl. No. 10/990,351;8 pages.

Morris, U.S Office Actions mailed on Feb. 27, 2006 directed at related U.S. Appl. No. 10/990,351;10 pages.

Morris,U.S Office Action mailed on Jun. 13, 2006 directed at related U.S. Appl. No. 10/990,351;8 pages.

Morris et al., U.S Office Action mailed on Dec. 7, 2007 directed at U.S. Appl. No. 11/442,614; 12 pages.

Morris et al., U.S Office Action mailed on Jun. 13, 2008 directed at U.S. Appl. No. 11/442,614; 13 pages.

Morris et al., U.S Office Action mailed on Feb. 10, 2009 directed at U.S. Appl. No. 11/442,614; 15 pages.

International Search Report and Written Opinion mailed Mar. 26, 2008, directed at related PCT application No. PCT/US2006/33356; 10 pages.

International Search Report dated Mar. 5, 2007, directed to related application No. PCT/US2006/011297; 10 pages.

Morris, S. et al., U.S. Office Action mailed on Sep. 28, 2009 directed to a related U.S. Appl. No. 11/442,614; 11 pages.

Eriksson, A., U.S. Office Action mailed on Oct. 15, 2009 directed to a related U.S. Appl. No. 11/509,820; 7 pages.

Brandofino, U.S. Office Action mailed Nov. 3, 2009, directed to related U.S. Appl. No. 11/391,673; 22 pages.

Brandofino et al., U.S. Office Action mailed May 3, 2011, directed to related U.S. Appl. No. 11/391,673; 25 pages.

Eriksson, A., U.S. Office Action mailed on Mar. 25, 2010, directed at U.S. Appl. No. 11/509,820; 8 pages.

Morris et al, U.S. Office Action mailed on Mar. 17, 2010, directed at U.S. Appl. No. 11/442,614; 11 pages.

\* cited by examiner

INTELLIGENT CALL MANAGEMENT AND REDIRECTION

REFERENCE TO RELATED APPLICATIONS

This application claims priority to U.S. Provisional Application No. 60/616,638, filed Oct. 8, 2004, the contents of which are hereby incorporated by reference.

FIELD OF THE INVENTION

The invention relates to using intelligent device inspection and interrogation in an application layer system to route packet-based network calls. In particular, this invention relates to using event-based variables, requested status variables and pre-defined rules to process call flow.

BACKGROUND

Users of traditional videoconferencing and teleconferencing services are accustomed to services such as voicemail, operators, and call redirection. Users of traditional services are further accustomed to navigating these services using a simplified interface, typically with a numeric keypad incorporated into a phone. Currently available videoconferencing systems do not offer these services in a convenient and easy to use package.

One of the most common problems a service subscriber encounters is a call rejection because the dialed number is incorrect or the other end does not answer. One of the most common problems with videoconferencing on all network systems including IP, ISDN, ATM, and private line systems is the poorly descriptive and confusing rejection messages a user may receive when a video call the user tries to place is not successfully connected.

Therefore, it would be advantageous to notify the user that the dialed number may be incorrect. This can easily improve user satisfaction and change the perception that videoconferencing doesn't work, when in fact there's a high probability that user error or a simple no answer could be causing the problem. Furthermore, it would be advantageous for the call routing system to redirect the failed call to another service where the caller may interact with a video mail application, with a video call assistant, or with a live or pre-recorded operator.

SUMMARY OF THE INVENTION

This invention includes systems, methods and computer-readable media for processing video calls.

In one embodiment, the method for routing packet-based network calls includes receiving destination endpoint status information from a destination endpoint, receiving a call request from an originating endpoint to initiate a call to the destination endpoint, determining if the destination endpoint is available to accept the call from the originating endpoint based on the received destination endpoint status information and a predefined destination availability rule, and, if the destination endpoint is unavailable, determining an alternative destination endpoint based on a predefined alternative routing rule and initiating a call to the alternative destination endpoint.

In another embodiment, the system for routing packet-based network calls includes a call manager configured for receiving destination endpoint status information from a destination endpoint, receiving a call request from an originating endpoint to initiate a call to the destination endpoint, determining if the destination endpoint is available to accept the call from the originating endpoint based on the received destination endpoint status information and a predefined destination availability rule, and determining an alternative destination endpoint based on a predefined alternative routing rule and initiating a call to the alternative destination endpoint if the destination endpoint is unavailable.

In another embodiment, the machine-readable medium includes program code for routing packet-based network calls by receiving destination endpoint status information from a destination endpoint, receiving a call request from an originating endpoint to initiate a call to the destination endpoint, determining if the destination endpoint is available to accept the call from the originating endpoint based on the received destination endpoint status information and a predefined destination availability rule, and if the destination endpoint is unavailable, determining an alternative destination endpoint based on a predefined alternative routing rule and initiating a call to the alternative destination endpoint.

Further embodiments can include methods, systems and machine-readable media for receiving the destination endpoint status information at a centralized call manager in response to polling the destination endpoint, automatically receiving the destination endpoint status information from the destination endpoint in response to a predefined event or condition at the destination endpoint, receiving the destination endpoint status information at a central call manager, routing one or more calls at a central call manager based on a user supplied conditional parameter and a network status parameter, routing one or more calls based on quality of service information received at a central call manager.

In still further embodiments, the predefined destination availability rule includes a parameter provided by a user of the destination endpoint, the predefined alternative routing rule includes a parameter specifying a video mail service, the central call manager is an application layer system, the destination endpoint status information indicates status as busy, and the destination endpoint status information indicates status as offline.

DETAILED DESCRIPTION OF THE INVENTION

Overview of Call Rejection Handling

Figure 1:
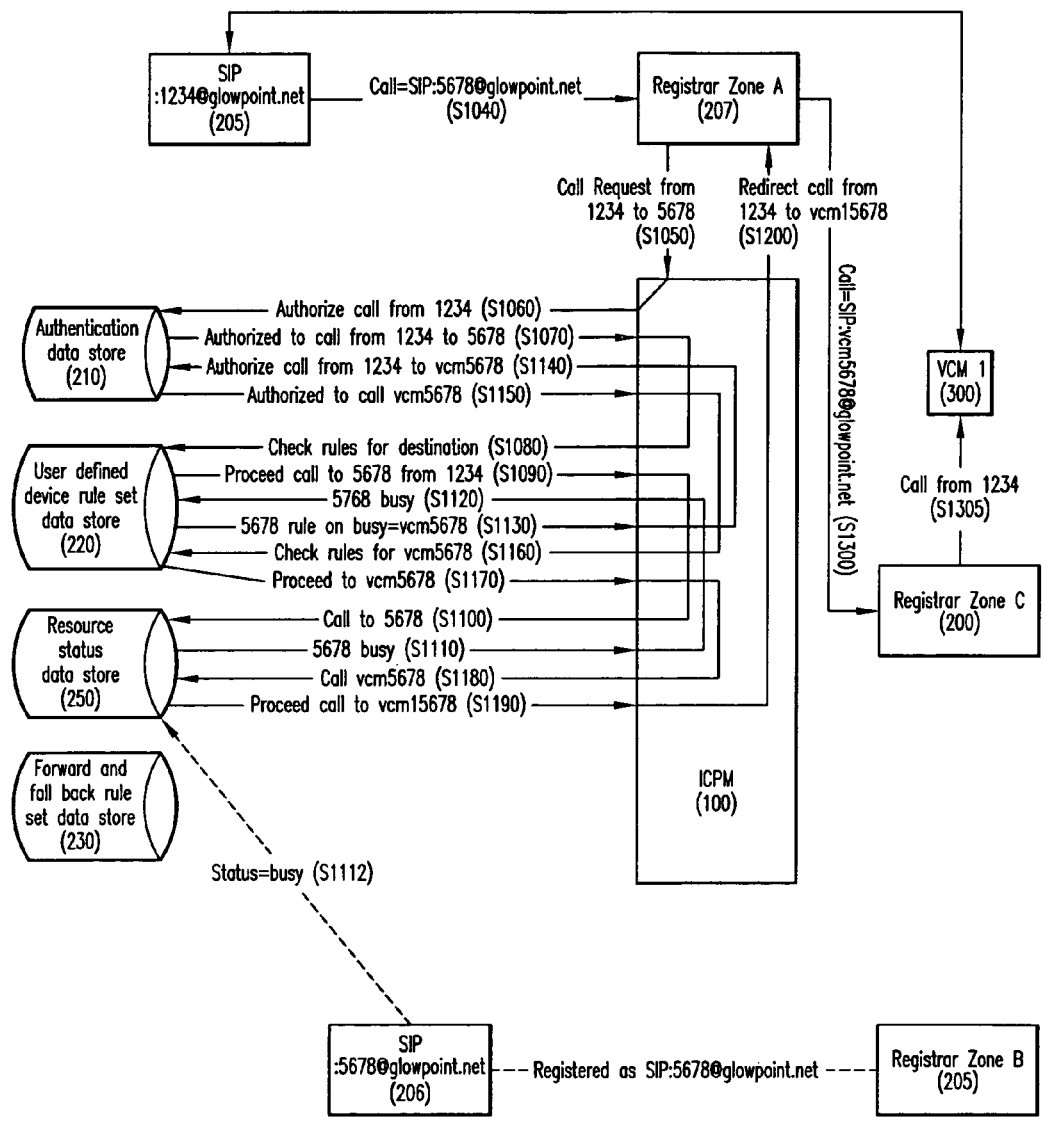
FIG. 1 illustrates an exemplary call flow for redirection of video calls to a video mailbox.

A video call may be rejected for any one of several reasons. As non-limiting examples, the endpoint called may be busy, not available, the endpoint may be improperly specified, or the endpoint may not exist.

The systems and methods described are capable of basic and advanced call handling services commonly found with typical consumer and business voice services. These services can be implemented using network intelligence and services that provide these phone-like capabilities without any need for customers to dedicate themselves to a specific type of codec. As non-limiting examples, the intelligent call policy manager (ICPM) or centralized call manager described herein can be used for the delivery of services such as video mail services, call rejection notices, and interactive voice responder (IVR) auto-attendant services based on system-defined and user-defined call handling parameters.

Some embodiments can include an application layer system for making decisions for routing calls based any combination of conditional parameters set by one or more users and parameters indicative of the status of network systems.

Intelligent Call Policy Management System

Some embodiments of the system can include an Intelligent Call Policy Management (ICPM) system which can also function as a central call manager. The ICPM can be configured to analyze and determine how video calls are handled and completed. In some embodiments, this can be accomplished by identifying the current state of network devices and applying pre-defined policies for the calling party (or originating endpoint) and the target party (or destination endpoint) along with knowledge of the status of network and system resources. These rules and status parameters can be used to properly process and complete call requests. The ICPM can also be configured to use a combination of several primary data variables to determine how to process requests. As a non-limiting example, three data variables could be: (1) the current state of a destination device reported as an event change (pro-active status), (2) the current state of a destination device as requested from the device (re-active polling of status), and (3) static rule sets defined for originating and destination endpoint devices (origin and destination call rule sets). By applying variables such as these, the ICPM can determine, on a call-by-call basis, how to route and complete a call to the correct destination without a real-time event disrupting call execution.

A. Event-based Variables

Some system statistics can be communicated and some devices can be programmed to communicate a change in status in real-time when an event occurs. A non-limiting example of this would be a video conferencing device that has a defined status of idle when it is not in a call. When the device places a call and is in use, the device informs the ICPM that its new status is busy/in call. Additionally, knowledge of device location can be communicated. Some devices do not have terrestrial limitations and can be used anywhere on a particular network or multiple networks. If the device knows where it is located, it can communicate this information to the ICPM so that the ICPM can determine how to handle call requests from the device or to the device.

B. Requested-Status Variables

Not all systems can communicate some or all of the variables of interest to the ICPM. Some legacy devices have no capability to communicate any information unless polled or programmed with a timer to send updates. In these cases, the ICPM can request information from a device when the device is not capable of intelligently communicating this information when an event happens. As a non-limiting example, when a device is idle/not in a call and a call is placed to it, the ICPM may not have a current status of the destination so it requests state information. The destination device then responds with its state as idle/not in a call. The call can then be connected. Furthermore, if a call is placed to that destination while it is in a call, the ICPM can request device status information from the destination endpoint. The endpoint device can respond with status of in a call. The ICPM can then use information in combination with one or more pre-defined rules to determine how to process the call request.

C. Static Rules

Pre-defined rules are variables that can be either defined by a system or by a system user. These rules can be used to inform the ICPM how calls are to be handled. These rules may define call routing without regard to endpoint device status. These rules can be applied to the originating endpoint as well as the destination endpoint and be based upon one or more rule sets for one or more devices.

As a non-limiting example, if a caller is not authorized to place a call to a particular destination, the caller's rule set may define the destination endpoint as restricted so that the ICPM can handle the call based upon one or more pre-defined policies or rules describing how to handle a call from that particular destination based on the destination requested and pre-defined destination endpoint policies and/or rules.

As a non-limiting example, a caller may be delinquent in submitting payment to their account. The billing system can automatically set a restriction rule for that caller which prevents the caller from calling any device except for those identified on a pre-defined list. The caller is redirected to a pre-determined endpoint regardless of the caller's designated destination endpoint. Similarly, if the destination party is delinquent in making payments, calls placed to it may be restricted and handled based upon pre-defined rules defined for the destination endpoint.

The rules described herein can be associated with both individual endpoints and individual users as well as groups of endpoints and groups of users.

System Processes

The ICPM can be configured to function as an intelligent call routing manager based on pre-defined rule sets and information provided automatically or upon request. The ICPM can be configured to collect and request status information including specific variables from multiple devices. This function can be used in real-time to properly route a video call. The ICPM can also be configured to determine and communicate the route of calls to the proper destination.

Information used by the ICPM in call routing can be gathered from any network-accessible location or endpoint. As non-limiting examples, accessible systems and devices can include appliance-based video codec systems (videoconferencing system) including those compatible with H.320, H.323, SIP or any other standard/non-standard communication device, network appliances including switches, routers, network terminators, registrars and/or gatekeepers, multipoint control units (MCUs), data storage devices, media streaming servers, and databases.

Call Process Flow

An exemplary call process flow is illustrated below in connection with FIG. 1. When a call is placed (S1040) by a device (205), the dial string of the requested destination is sent (S1050) from the device's registrar (207) to the ICPM (100). The ICPM (100) can be configured to identify the caller by the caller's unique ID which can be in the form of, for example, URI, NPA, DID, or E.164 data. Once the caller is identified, the ICPM (100) can check (S1060) whether the caller is authorized to make an outgoing call by comparing particulars about the outgoing call request to information in an authentication data store (210). Authorization information is then communicated (S1070) to the ICPM (100).

The ICPM (100) can also be configured to identify the requested destination from the caller. In some embodiments, the dial string provided by the caller can be used to identify the preferred destination. The ICPM can attempt to locate the requested destination. If the destination can be located, the ICPM performs a lookup (S1080) of the rules and status of the destination in the device rule set data store (220). If the destination is not recognized or cannot be located, the ICPM (100) can then look up the caller's rule set for the case in which the destination is unrecognized or unlocatable. The ICPM (100) can then validate and follow any pre-defined rule applied to the caller. The ICPM can then review the destination pre-defined rule set (S1080). If there are either no pre-defined rules or if the defined rules allow the call to continue to the requested destination, the ICPM proceeds to the next step and the ICPM (100) proceeds to call the destination (S1090).

The ICPM (100) can then check status of the destination (S1100) to determine if the call can be sent to the designated device. In this example, the requested call to 5678 is checked against resource status data stored in the resource status data store (250). The status of the requested destination is sent (S1110) from the resource status data store (250) to the ICPM (100). In the example illustrated in FIG. 1, status information from endpoint 5678@glowpoint.net (206) has been communicated (S1112) to the resource status data store (250). In the illustrated example, 5678@glowpoint.net (206) has been registered with a registrar in zone B (205). One or more pre-defined destination availability rules can be applied to determine if the call is permitted to proceed, i.e., if the specific destination is available to accept the call from the specific caller. These rules can include one or more user-supplied conditional parameters. In one non-limiting example, a user could specify a rule that conditions acceptance of an incoming call on identification of the caller as a member of a particular group. Call acceptance could also be conditioned on the time of day a call is placed or any other aspect or attribute that characterizes an incoming call.

If the destination does not accept the call, the ICPM (100) can then lookup the destination's pre-defined rules (S1120) to determine if any apply to the event of the particular call failure condition. If a rule defining an alternate destination exists for the destination, the ICPM (100) will then route the call to that new destination, thereby effectively repeating some or all of the processes described above for the new destination. These defined rules and other rules can be included as part of a predefined alternative routing rule set. As a non-limiting example, a system administrator or any other user can configure the alternative routing rules. The alternative routing rules could, as non-limiting examples, specify that calls will be routed to a video call assistant, a video auto attendant, a video mail server, or any other endpoint capable of receiving a call. These rules can also include one or more user-supplied conditional parameters.

If there is no rule set for the call failure condition, the ICPM (100) will then return to the caller's pre-defined rules set for the call failure condition. In the example shown in FIG. 1, the destination has defined a device rule that redirects calls on busy to vcm5678. The selected rule is communicated (S1130) to the ICPM (100). Based on the defined rule, the ICPM (100) will then route the call to that new destination. To connect the call to the new destination, the processes described above can be repeated in whole or in part.

Authorization to make the call from 1234 to vcm5678 can then be verified (S1140). Results of the authorization are communicated (S1150) to the ICPM (100). The destination rules for vcm5678 are checked (S1160) and communicated (S1170) to the ICPM (100) so that the call to vcm5678 can proceed. The status of vcm5678 is checked (S1180) in the resource status data store (250). In the example illustrated in FIG. 1, vcm5678 is shown to be available and data conveying this fact is communicated (S1190) to the ICPM (100). In the example, the call is successfully redirected (S1200) from 1234 to vcm5678.

If vcm5678 is in a second registrar zone, registrar (207) can be configured to forward the call (S1300) to another registrar (200). The second registrar (200) can then forward the call (S1305) to a video call mailbox server (300).

While the various data stores in FIG. 1 are shown as discrete entities, one of ordinary skill in the art would also appreciate that they could be individually or as a group incorporated into the ICPM (100). Some or all of the rules described herein could also be stored in a forward and fall back rule set data store (230).

Call Flow Load Balancing

Since the ICPM can be configured to be aware of various resources, systems and events currently in progress, the ICPM can provide redundant redirection and load balancing capability for the network.

There are a variety of destinations to which a call can be connected based upon the routing and redirection rules defined for processing a call. Services such as, but not limited to, video call mailbox, video call assistant, multipoint conferencing, PSTN gateway resources, media libraries, etc. can be more intelligently utilized by identifying a caller's need and evaluating available resources and the locations of those resources to balance loads between multiple systems and to redirect calls while making an economically and technically efficient use of network and system resources.

Based upon information the ICPM collects from the network, effective routes can be defined for the video call. Thus, a statically defined or round robin approach to reaching resources need not be used. Since a real-time video communication stream is bi-directional and is sensitive to network and systems performance, the ICPM can provide quality of service (QoS) functionality at the application level.

Video Call Assistant

In some embodiments, a rejected call may be redirected to a video call assistant (VCA) server which can be configured to answer the call and provide a recorded video message that informs the user the call could not be completed.

As a non-limiting example, the message could inform the caller as follows: "Thank you for using your service provider. The party you tried to dial is either busy, not available, or could not be found. Please check your number and dial again or try again shortly. If you would like to receive assistance please contact your service provider by dialing '000'."

In some embodiments, the video call assistant can select and present an informational video to a caller based on information about the reason for the failure to complete the call. For example, if the call was not completed because the recipient did not accept or answer the call, an appropriate message can be selected and presented to the caller. Such a message could be followed by an on-screen directory for providing the caller with the choices of hanging up or selecting from a list of informational videos for viewing. The caller may then use the dial pad on a remote control and, through the use of DTMF tones, navigate the menu.

Many videoconferencing endpoint systems include the ability to transmit Dual Tone Multi Frequency (DTMF) functions. This functionality allows a user to use basic tones as found on a standard telephone to communicate with an interactive response system which recognizes a tone and executes functions programmed in association with the recognized tone. Some of the user inputs received through interfaces described herein can be received as DTMF signals.

As a non-limiting example, the informational video options could include: How to Contact Your Service Provider for Help, How to Place an ISDN Call, About Your Service Provider, Joke of the Week, and other categories including advertising. In some embodiments, the videos could be of any length and stored as Windows Media formatted digital files which can be changed and rearranged. In some embodiments, a caller who as entered a wrong number or whose call cannot be completed can be provided an audible or visual message informing him of the error and suggesting an action for correcting the error or problem.

Video Call Auto Attendant

In some embodiments, the video call assistant can also perform functions associated with an auto attendant. An auto attendant can be used to create a single point of contact number for callers by providing a single number rather than thousands of numbers for each phone in the company. The auto attendant can be configured to provide the caller with an on screen menu and a visible message asking the caller to select a destination for the call when a call is not successfully connected to its destination. As described above, in some embodiments a caller can use DTMF tones to navigate and select options through the menus.

Figure 12:
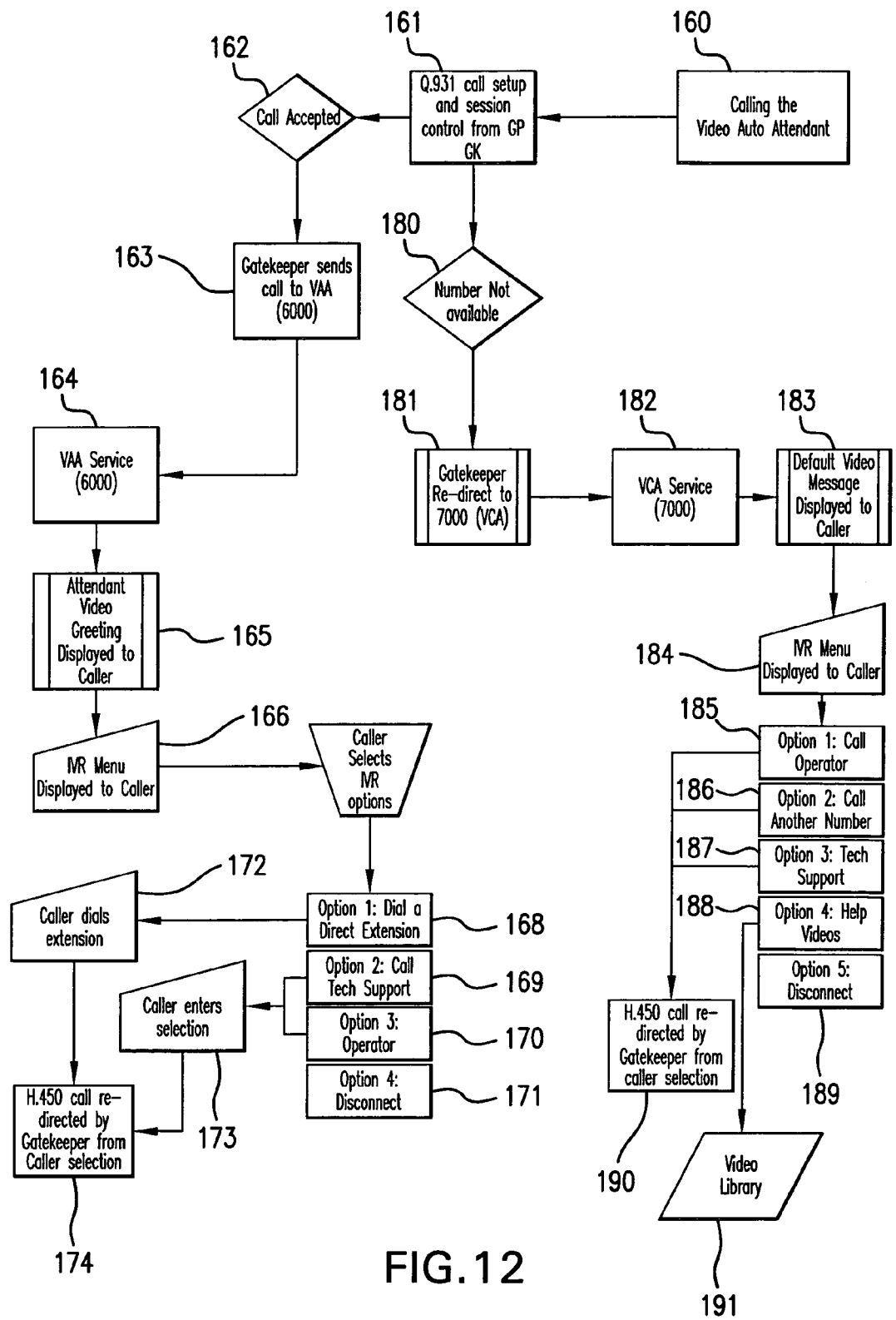
FIG. 12 illustrates exemplary procedures for video call redirection to a video auto attendant.

FIG. 12 illustrates a non-limiting example of call processing with a video auto attendant. As illustrated in FIG. 12, a call can be placed to video auto attendant (160). Call setup and session control for the call to the video auto attendant can be provided by a network gatekeeper (161). If the call is accepted (162), the call can be transferred by the gatekeeper to the video auto attendant (163). The video auto attendant server (164) can present a video greeting to the caller (165). In some embodiments, the video auto attendant can also present a menu of options (166) for caller selection (167). As non-limiting examples, the options can include dialing a direct extension (168), calling technical support (169), calling an operator (170), and disconnecting (171). If the caller selects calling technical support (169) or calling an operator (170), the caller selection (173) can cause the call to be redirected by a gatekeeper to the selected destination (174). If the caller has selected the option for dialing a direct extension (168) and dialed a direct extension (172), the call can also be redirected by a gatekeeper to the selected destination (174).

If the called number is not available (180), then a gatekeeper (181) can redirect the call to a video call assistant server (182). The video call assistant server (182) can present a predetermined video message to the caller (183). The caller can also be presented with a menu for making selections (184). The menu (184) can include exemplary options such as, but not limited to, calling an operator (185), calling another number (186), calling technical support (187), viewing video help files (188), and disconnecting (189). If the operator (185), another number (186), or technical support (187), are selected, the call can be redirected by a gatekeeper to the selected destination (190). If the video help files (188) are selected, the caller can be presented files available in a video library (191).

Video Call Mailbox

Some embodiments can include a video call mailbox (VCM) which can be configured to answer a call when the intended recipient either chooses not to answer or is not available to answer the call. The caller can then be greeted by a recorded video message from the owner of the mailbox stating that the owner unavailable and requesting the caller to leave a message. The caller would then be prompted to record a message. Additional caller options can include a key press for additional options or hanging up.

Figure 2:
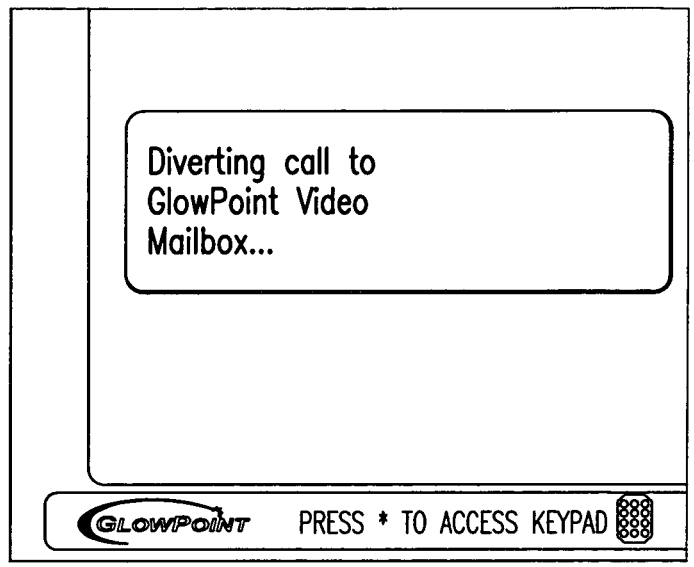
FIG. 2 illustrates an exemplary user interface for showing diversion of an outgoing call.
Figure 3:
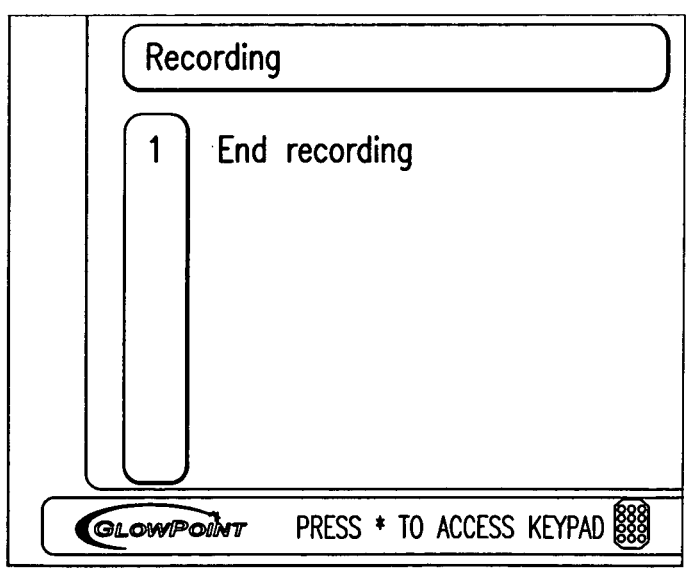
FIG. 3 illustrates an exemplary user interface for presenting a user option for ending a recording.
Figure 4:
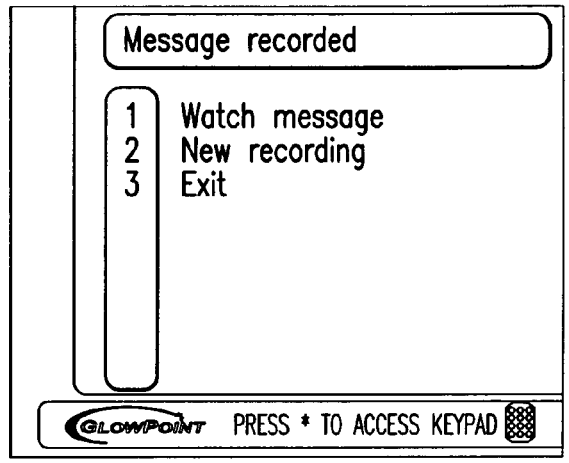
FIG. 4 illustrates an exemplary user interface for presenting options to a user after a message has been recorded.

When call redirection takes places and the video call mailbox receives a call, the caller can be notified visually. An exemplary notification to the caller of diversion to the video call mailbox is shown in FIG. 2. After display of the prerecorded video greeting, the caller can record a message. An exemplary user prompt to end recording is shown in FIG. 3. After recording is completed, the user can be presented with additional options including watching the recorded message, creating a new recording which can replace or supplement the first recording, or exiting the system. An exemplary user interface for use in connection with recording a message is shown in FIG. 4.

Figure 5:
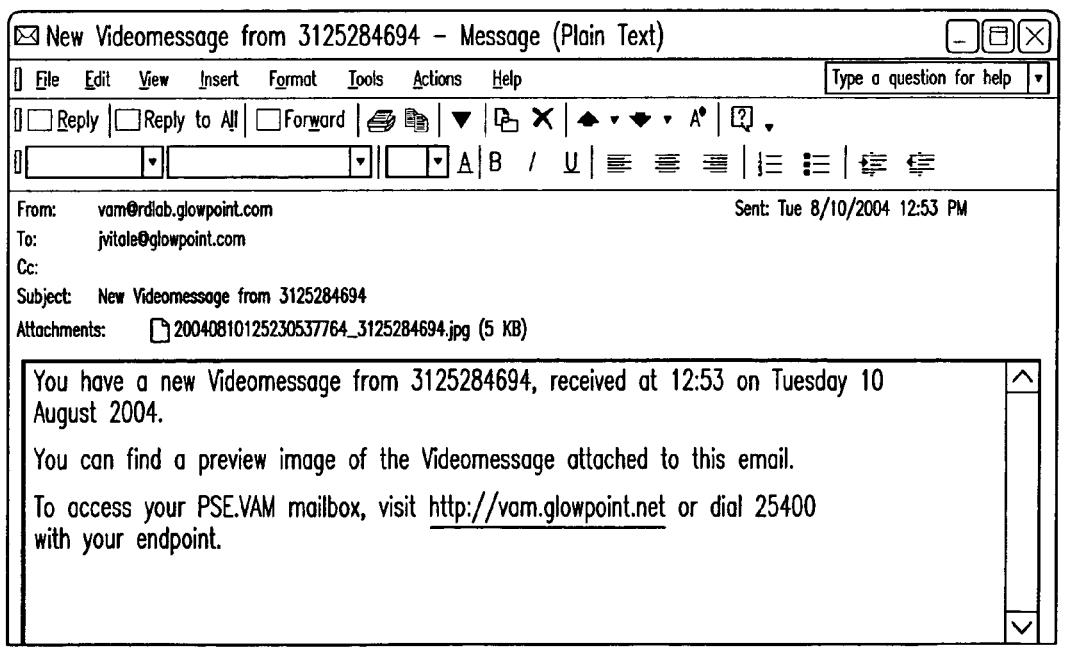
FIG. 5 illustrates an exemplary email notification of a new video message.

The system can be configured to store the recorded message and send a notification to the intended recipient's email address. The email can provide a text message containing information about the missed call. As non-limiting examples, the information can include call details, time, and caller identification. An exemplary notification message is illustrated in FIG. 5. The notification can also provide a selected video frame as a picture of the caller as an attachment or in the body of the message. In some embodiments, the first video frame of the message can be selected for this purpose. The notification message can include a hyperlink which can be selected by the message recipient which would then direct the recipient to the video call mailbox message server or another server where the recipient can access the mailbox and review messages. In some embodiments, when a message is selected, the video can be streamed to the viewer in a Windows Media format.

Figure 6:
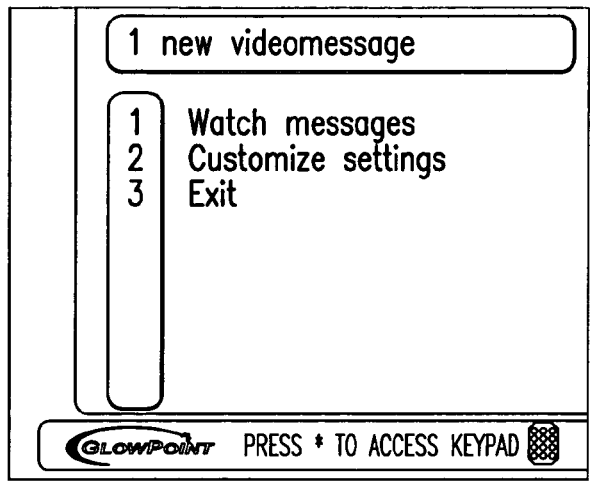
FIG. 6 illustrates an exemplary user interface for presenting options for viewing a message.

In some embodiments, a recipient can call the video call mailbox server directly from a videoconferencing endpoint. The video call mailbox server can be configured to answer the call and provide a selection menu for reviewing any messages or customizing the mailbox settings. An exemplary interface for prompting the user is illustrated in FIG. 6. In some embodiments, the video call mailbox server can be configured to accept audio-only calls from endpoints and present the audio portion of one or more recorded messages. The system can also include individual audio prompt recordings for providing audible instructions for navigation though the menus.

Figure 7:
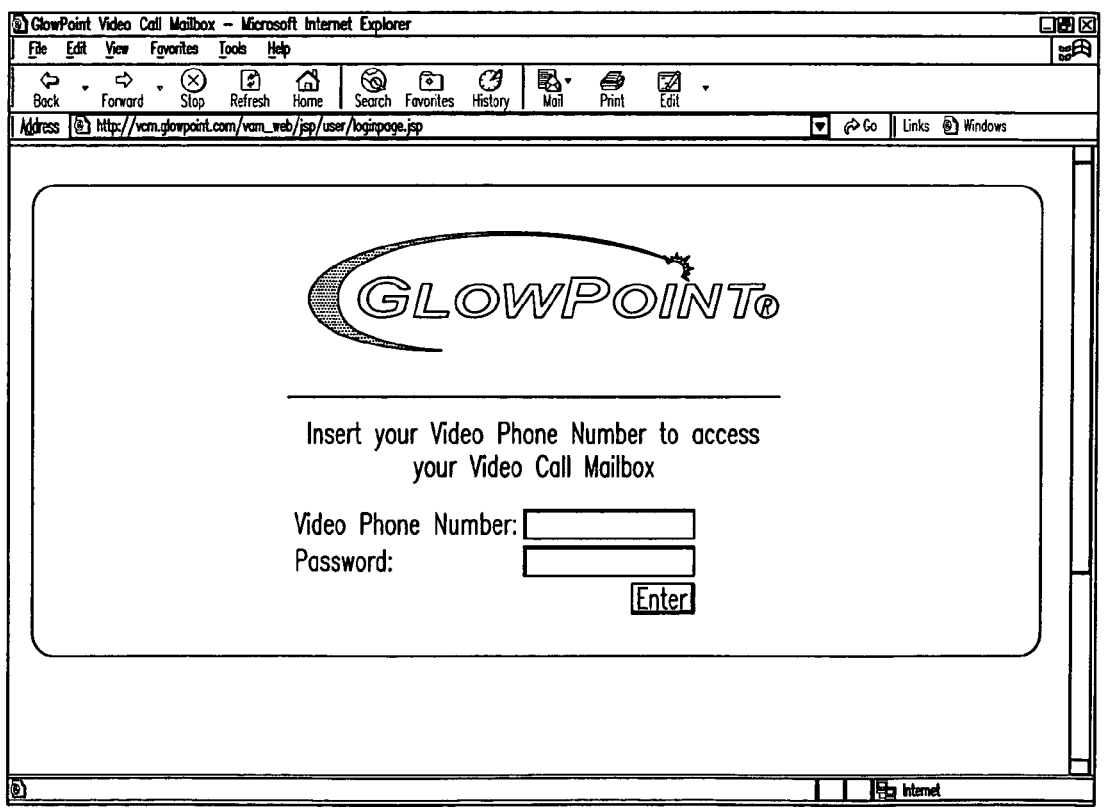
FIG. 7 illustrates an exemplary user interface for authenticating a user before accessing a video message.
Figure 8:
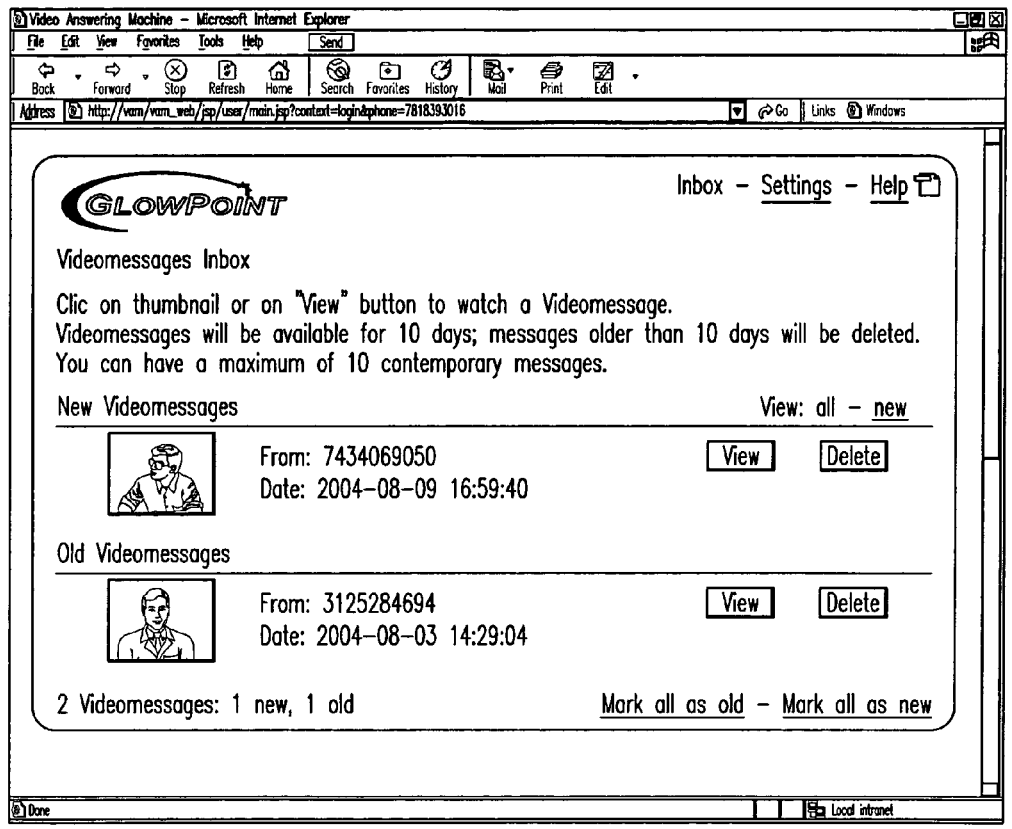
FIG. 8 illustrates an exemplary user interface for displaying new and old video messages.
Figure 9:
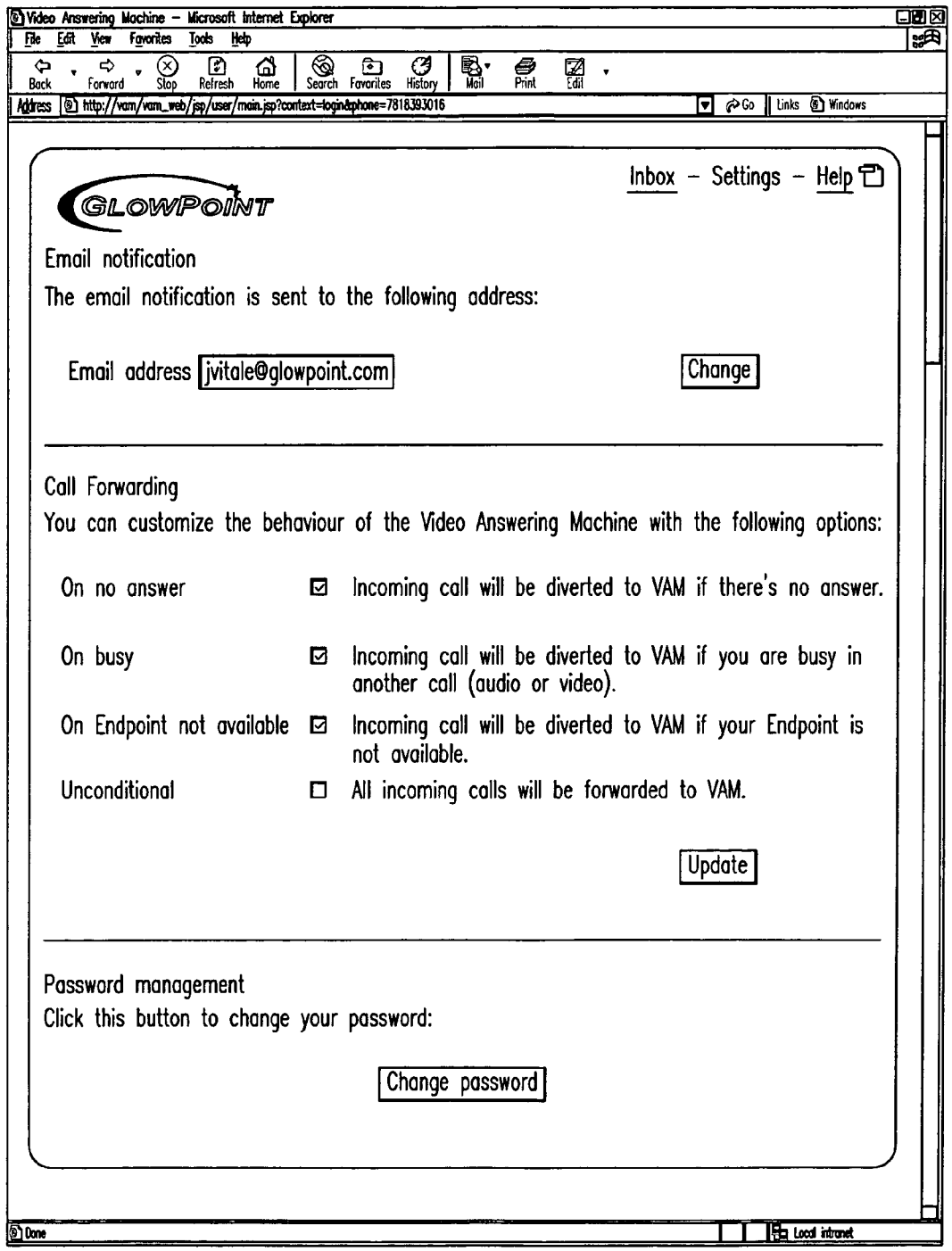
FIG. 9 illustrates an exemplary user interface for configuring email notification, call forwarding and password management.

A user may be required to login or authenticate to the video call mailbox system to retrieve video messages. An exemplary interface for soliciting this logon information is shown in FIG. 7. Once the user has logged in, an interface such as the exemplary interface shown in FIG. 8 may be presented to the user. In the illustrated example, a selected frame from each of two video messages is shown. FIG. 8 also illustrates a user-selectable "Settings" option. Through settings such as these, a video mailbox can be configured by its owner to include a customized greeting or a default greeting. Further settings configurations are illustrated in FIG. 9 and are discussed in more detail below.

Figure 10:
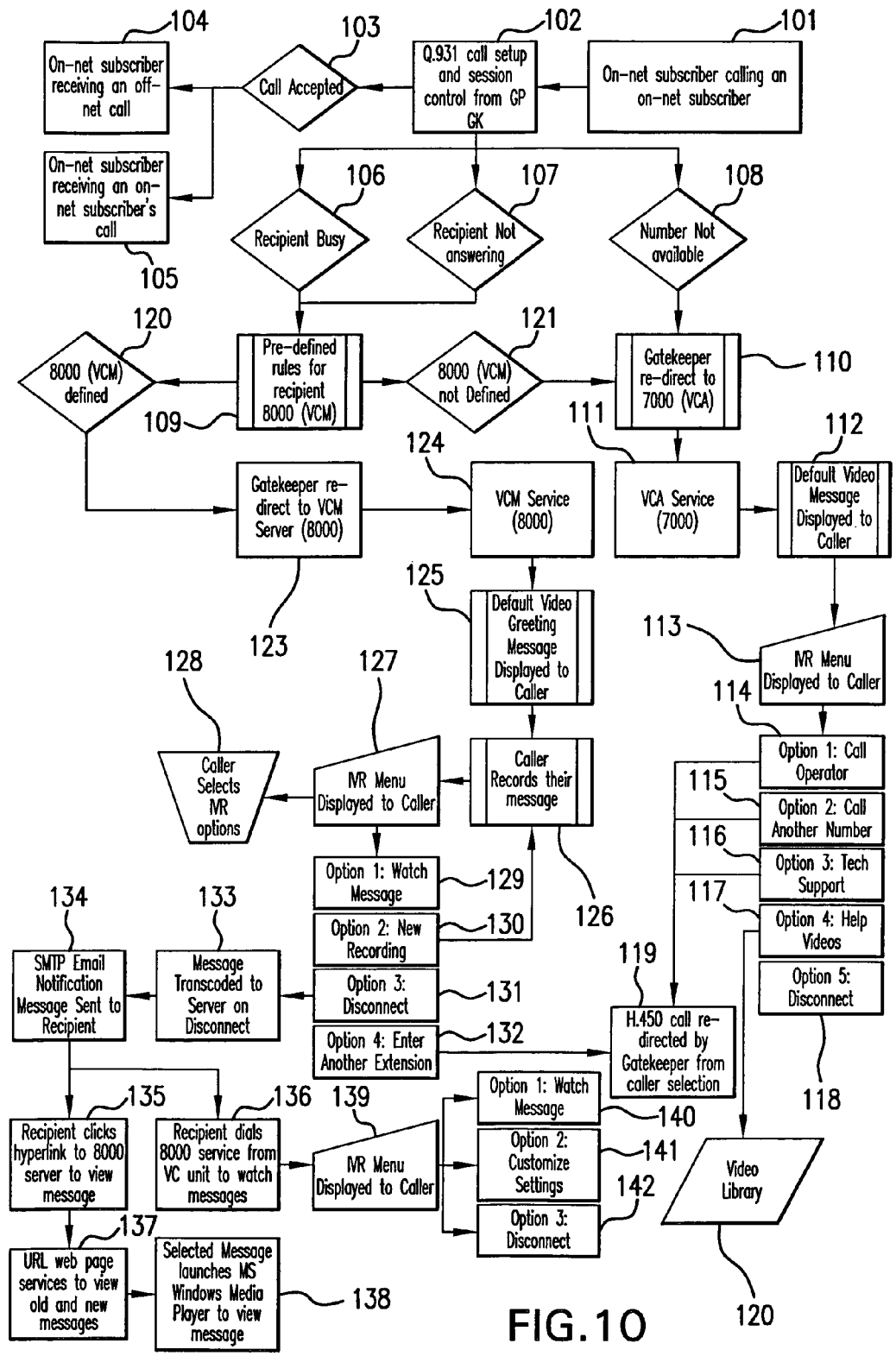
FIG. 10 illustrates exemplary procedures for video call redirection to a video mailbox or video assistant.

FIG. 10 illustrates a non-limiting example of call processing for a subscriber on a first network calling another subscriber on the same network (101). In the example of FIG. 10, call setup and session control can be provided by a network gatekeeper (102). If the call is accepted (103), the called network subscriber can receive the call from the on-network caller (105). If the dialed number is not available (108), a gatekeeper can redirect the call (110) to a video call assistant (111). The video call assistant service (111) can then display a predefined video message to the caller (112). In some embodiments, an interactive menu can be displayed for the caller (113).

The menu (113) can include exemplary options such as, but not limited to, calling an operator (114), calling another number (115), calling technical support (116), viewing video help files (117), and disconnecting (118). If the operator (114), another number (115), or technical support (116), are selected, the call can be redirected by a gatekeeper to the selected destination (119). If the video help files (117) are selected, the caller can be presented files in a video library (120).

If the recipient is busy (106) or not answering (107), predefined rules for the recipient can be also applied (109). If the recipient has not arranged for a video call mailbox (121), the call may be redirected to a video call assistant (110). Upon redirection to the video call assistant (110), the call may be processed as described above. If the recipient has arranged for a video call mailbox (122), then a gatekeeper can redirect (123) the call to a video call mailbox server (124). The video call mailbox server (124) can present a predetermined video greeting to the caller (125). The caller can then record a message (126). During the recording or after the recording is complete, a interactive menu can be presented to the caller (127) for selection by the caller (128). The menu (127) can include options such as, but not limited to, watching the recorded message (129), recording a new message (130), disconnecting (131), or entering another extension (132). If the caller enters another extension (132), the call can be redirected by a gatekeeper (119).

After the caller has completed leaving a message for the recipient, the caller can disconnect (131). Upon completion of the message, the message can be recorded on a video call mailbox server (133). An email or other notification of the message can be sent to the recipient (134). The notification message can include a URL hyperlink to the server for viewing the message (135). The server can then present a web page for viewing new and/or old messages (137). Selection of a message by the user can cause a media player to launch for viewing one or more of the messages (138).

The recipient can also call the video call mailbox server directly to watch or listen to messages without first receiving the email notification (136). In this case, the recipient can be presented with an interactive menu (139). The menu can include exemplary options such as, but not limited to, watching one or more video messages (140), customizing settings (141), or disconnecting (142).

Figure 11:
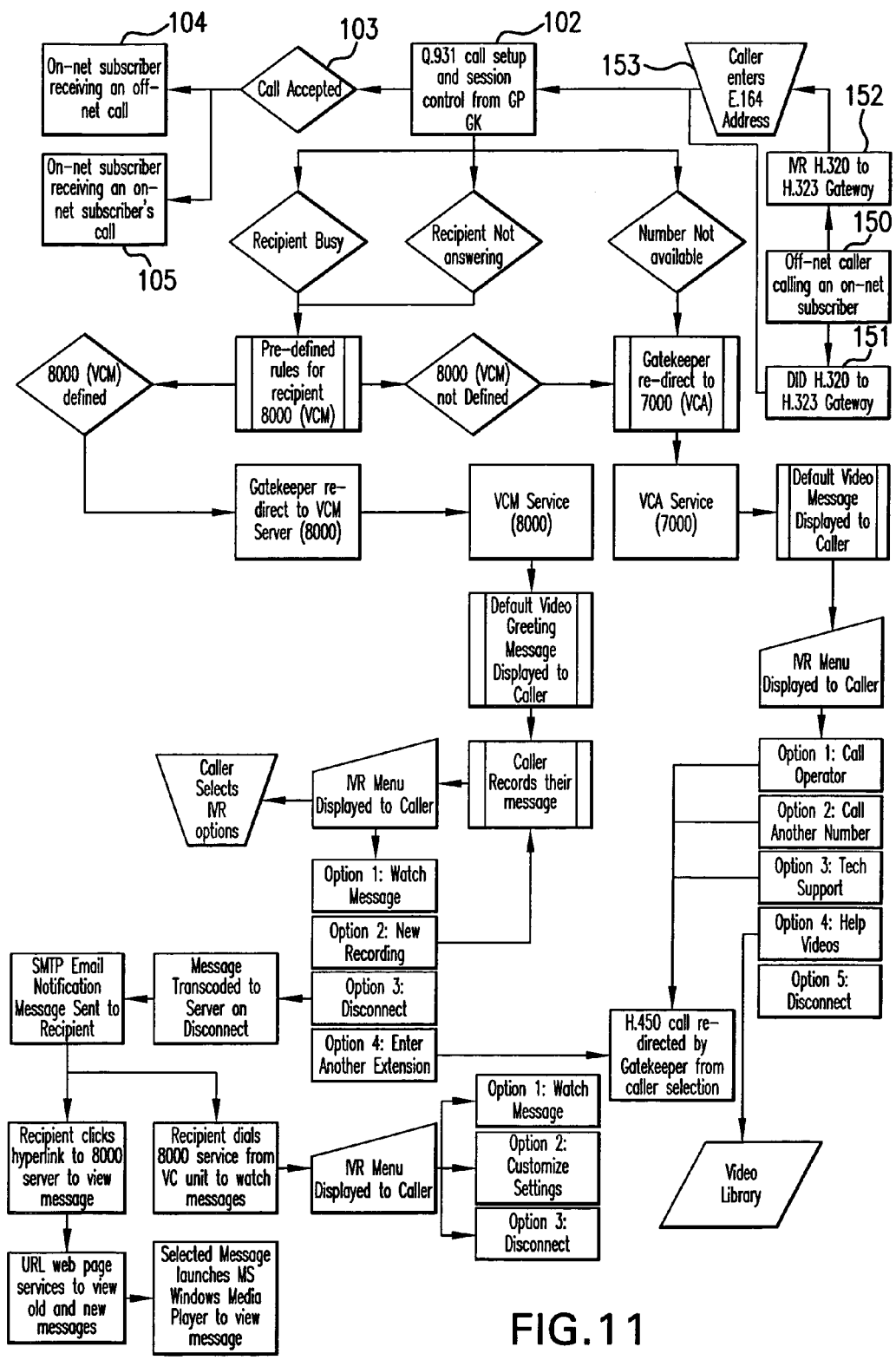
FIG. 11 illustrates exemplary procedures for video call redirection to a video mailbox or video assistant.

FIG. 11 illustrates the call processing described above for a subscriber on a first network calling a subscriber on a second network. As shown in the non-limiting example of FIG. 11, the caller on the first network places a call to a recipient on a second network (150). As non-limiting examples, the call may be from an IVR H.320 source (152) or from a DID H.320 source (151). If the call is from a IVR H.320 source (152), the caller can enter an E.154 address (153) before call setup and session control are provided by a network gatekeeper (102). If the call is accepted (103), the called on-network subscriber can receive the call from the off-network caller (104).

User Interface

Though the user interface illustrated in FIG. 9 or another user interface, the user can setup call handling preferences by defining rules which direct the network to handle the user's calls at any given time in the manner defined by the user. The tool could be implemented as a online interface for providing the user with various choices. As illustrated in FIG. 9, the user can configure the email address to which notifications are sent, configure the operation of the video answering machine, and manage passwords. As non-limiting examples, call forwarding can be configured based on conditions such as no answer, busy, and endpoint not available. Call forwarding can also be configured to take place unconditionally.

As non-limiting examples, these choices can include some or all of the following rules: a "no answer" condition defining call handling if the destination endpoint does not answer; a "busy" condition defining call handling if the destination endpoint is currently in a call (in some embodiments, the call may be redirected); and an "unconditional" condition defining call handling procedures even if the requested destination is available to receive a call but the incoming call should be forwarded somewhere else. These conditions and other settings can be programmed via a user portal or other convenient interface for defining a user profile. In some embodiments, the user configuration stored is stored in a profile and is retrievable from any location for modification including adding, editing or removing rules.

In a first non-limiting example, a group conference room system can be configured with advanced calling features stored in a profile associated with the conference room. The administrator of the system can configure a standard set of rules. However, when the group is either out of the office or on vacation, the group may wish to have calls handled in a different manner. If the group is on vacation, the group may want to redirect calls to someone else for assistance. Alternatively, the system may be unavailable and calls may need to be redirected to another conference room. The profile associated with the conference room can be configured to implement these routing preferences. In a second non-limiting example, a personal system can be configured with advanced calling features. The owner for the system can have a standard set of rules configured for the case where the owner is in the office. However, on occasion the owner is not available to receive the call. The profile associated with the personal system can be configured to implement routing preferences so that the call can be forwarded to a video mail server, or to a cell phone, or to the receptionist.

One of ordinary skill in the art would appreciate that any of the rules, parameters and configuration options described herein can be provided though a web interface and made available to users on stationary as well as on mobile devices. An online portal could also be used to allow subscribers to add and modify services, features and preferences without manual intervention and processing by the service provider.

While the above description is provided with reference to the Internet and other networks, one of skill in the art would recognize that any wired or wireless network that provides for addressable endpoints could be used. The networks described above may or may not include portions of the Internet. One of skill in the art would also recognize that while individually addressable endpoints allow specific content to be delivered to individual users, the network and systems could be used to broadcast the same content to a plurality of users.

Additionally, while reference may be made to specific codecs in the above description, any standards based audio or videoconferencing codec resident on a computing platform or in an appliance, in any environment, could be used in the described systems and methods. One of ordinary skill in the art would recognize that the systems and methods described herein can be implemented on any software or hardware platform. As non-limiting examples, server products provided by Dylogic, such as the PSE.VAM or Microsoft™ Windows™-based systems could be used.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein.

The invention claimed is:

1. A method for routing packet-based network video calls, the method comprising:
   receiving destination endpoint status information from a destination endpoint, wherein the destination endpoint status information is received from a resource status data store, and wherein the destination endpoint status information is collected in the resource status data store in response to polling the destination endpoint;
   receiving a video call request from an originating endpoint to initiate a video call to the destination endpoint;
   determining, using a microprocessor, if the destination endpoint is available to accept the video call from the originating endpoint based on the received destination endpoint status information and a predefined destination availability rule; and
   if the destination endpoint is unavailable, using a microprocessor to
      forward the video call to a video call mailbox associated with the destination endpoint and provide a visual indication of the redirection,
      record a video message at the video call mailbox, and send a notification to an electronic mail address associated with the destination endpoint, the notification including information about the video message and a link directed to a server configured to allow access to the video call mailbox.

2. The method of claim 1, further comprising automatically receiving the destination endpoint status information from the destination endpoint in response to a predefined event or condition at the destination endpoint.

3. The method of claim 1, wherein the predefined destination availability rule comprises a parameter provided by a user of the destination endpoint.

4. The method of claim 1, wherein the call manager is an application layer system.

5. The method of claim 1, further comprising routing one or more calls at a call manager based on a user-supplied conditional parameter and a network status parameter.

6. The method of claim 1, wherein the destination endpoint status information indicates status as busy or offline.

7. The method of claim 1, further comprising routing one or more calls based on quality of service information received at a call manager.

8. The method of claim 1, wherein the notification includes a video frame from the recorded video message as an attachment.

9. The method of claim 1, wherein the notification includes a video frame from the recorded video message in a body of the notification.

10. A system for routing packet-based network video calls, the system comprising:
    a call manager, implemented using a microprocessor, configured for:
       receiving destination endpoint status information from a destination endpoint, wherein the destination endpoint status information is received from a resource status data store, and wherein the destination endpoint status information is collected in the resource status data store in response to polling the destination endpoint,
       receiving a video call request from an originating endpoint to initiate a video call to the destination endpoint, and
       determining if the destination endpoint is available to accept the video call from the originating endpoint based on the received destination endpoint status information and a predefined destination availability rule; and
    a video call mailbox, implemented using a microprocessor, associated with the destination endpoint configured to record a video message,
    wherein if the destination endpoint is unavailable, the call manager forwards the video call to the video call mailbox and provides a visual indication of the redirection and the system send a notification to an electronic mail address associated with the destination endpoint, the notification including information about the video message and a link directed to a server configured to allow access to the video call mailbox.

11. The system of claim 10, wherein the call manager is further configured for automatically receiving the destination endpoint status information from the destination endpoint in response to a predefined event or condition at the destination endpoint.

12. The system of claim 10, wherein the call manager is further configured for applying a predefined destination availability rule, the rule further comprising a parameter provided by a user of the destination endpoint.

13. The system of claim 10, wherein the call manager is an application layer system.

14. The system of claim 10, wherein the call manager is further configured for routing one or more calls at the call manager based on a user supplied conditional parameter and a network status parameter.

15. The system of claim 10, wherein the destination endpoint status information indicates status as busy or offline.

16. The system of claim 10, wherein the call manager is further configured for routing one or more calls based on quality of service information received at the call manager.

17. A non-transitory machine-readable medium having program code stored thereon which, when executed by a machine, causes the machine to perform a method, the method comprising:
    receiving destination endpoint status information from a destination endpoint, wherein the destination endpoint status information is received from a resource status data store, and wherein the destination endpoint status information is collected in the resource status data store in response to polling the destination endpoint;
    receiving a video call request from an originating endpoint to initiate a video call to the destination endpoint;
    determining if the destination endpoint is available to accept the video call from the originating endpoint based on the received destination endpoint status information and a predefined destination availability rule; and
    if the destination endpoint is unavailable,
       forwarding the video call to a video call mailbox associated with the destination endpoint and providing a visual indication of the redirection,
       recording a video message at the video call mailbox, and sending a notification to an electronic mail address associate with the destination endpoint, the notification including information about the video message and a link directed to a server configured to allow access to the video call mailbox.

18. The non-transitory machine-readable medium of claim 17, wherein the method further comprises automatically receiving the destination endpoint status information from the destination endpoint in response to a predefined event or condition at the destination endpoint.

19. The non-transitory machine-readable medium of claim 17, wherein the predefined destination availability rule comprises a parameter provided by a user of the destination endpoint.

20. The non-transitory machine-readable medium of claim 17, wherein the call manager is an application layer system.

21. The non-transitory machine-readable medium of claim 17, wherein the method further comprises routing one or more calls at a call manager based on a user supplied conditional parameter and a network status parameter.

22. The non-transitory machine-readable medium of claim 17, wherein the destination endpoint status information indicates status as busy or offline.

23. The non-transitory machine-readable medium of claim 17, wherein the method further comprises routing one or more calls based on quality of service information received at a call manager.

* * * * *